United States Patent [19]
Price et al.

[11] 3,828,235
[45] Aug. 6, 1974

[54] VARIABLE DUTY CYCLE TRACTION MOTOR CONTROL PROVIDING CONTROLLED PLUGGING

[75] Inventors: Raymond G. Price, Franklin; Frederick A. Stich, Milwaukee, both of Wis.

[73] Assignee: Allis-Chalmers Corporation, Milwaukee, Wis.

[22] Filed: Apr. 9, 1973

[21] Appl. No.: 349,562

[52] U.S. Cl. .............................................. 318/373
[51] Int. Cl. .......................................... H02p 3/10
[58] Field of Search ........... 318/139, 341, 373, 503, 318/599

[56] References Cited
UNITED STATES PATENTS
3,551,769  12/1970  Tedd .............................. 318/373 X
3,694,721  9/1972  Henry .............................. 318/341
3,710,216  1/1973  Smith .............................. 318/373

*Primary Examiner*—Robert K. Schaefer
*Assistant Examiner*—W. E. Duncanson, Jr.
*Attorney, Agent, or Firm*—Lee H. Kaiser

[57] ABSTRACT

A vehicle driven by a reversible electric traction motor controlled by variable duty cycle current pulses from a battery reduces the frequency of oscillator triggering pulses when the direction selection lever is reversed and the motor is being driven as a generator in order to reduce field excitation and provide smooth plugging when vehicle direction is reversed but does not change triggering pulse frequency if the motor is driven as a generator when the vehicle is rolling backward down a ramp and full tractive power is required. A plugging potentiometer permits setting the maximum severity of plugging.

25 Claims, 2 Drawing Figures

VARIABLE DUTY CYCLE TRACTION MOTOR CONTROL PROVIDING CONTROLLED PLUGGING

This invention relates to a variable duty cycle control for a traction motor and in particular to such a control providing controlled plugging of the motor.

BACKGROUND OF THE INVENTION

Controls are known for selectively varying the duty cycle of voltage pulses applied from a battery to a DC series traction motor in order to regulate the speed of a vehicle such as a fork lift truck driven by the motor. In such a control the vehicle operator may step on a foot pedal, or accelerator, which controls a speed potentiometer to regulate the time duration, or duty cycle, of thy voltage pulses applied by the power switch to the motor, and the operator may actuate a direction selection lever to reverse the polarity of the field winding of the traction motor and thus change the direction of travel of the truck. Although the operator may inherently relax the accelerator when changing the direction in which the truck is driven, the truck may not decelerate sufficiently under all conditions to prevent jolts and jerking when the direction of the truck is reversed. If the driver intentionally attempts to abuse the truck, the plugging of the motor may be so severe as to spill the load carried by the truck or to upset or to damage the truck such as by snapping the truck axle.

It is an object of the invention to provide an improved variable duty cycle control for a vehicle having controlled plugging of the traction motor.

It is a further object of the invention to provide an improved variable duty cycle control for a vehicle traction motor wherein the operator may select the severity of plugging of the motor when reversing the direction of travel of the vehicle.

It is still another object of the invention to provide an improved variable duty cycle control for a vehicle traction motor which has controlled plugging of the motor when the direction of the vehicle is reversed and also can provide full power to the motor when the vehicle is rolling backward down a ramp and is thus rotating the motor in the reverse direction so it is operating as a generator.

SUMMARY OF THE INVENTION

In accordance with the invention a vehicle driven by a reversible traction motor controlled by variable duty cycle control pulses has current sensing means to derive a "generator mode" signal when the motor is acting as a generator, means to generate a "direction change" signal in response to the opening of the forward or the reverse contactor and the closing of the other, and means responsive to the presence of both the generator mode signal and the direction change signal to reduce the frequency of the control pulses to thereby decrease field excitation and provide controlled plugging of the motor when vehicle direction is reversed. When the vehicle is rolling backward down a ramp and the motor is being driven as a generator, control pulse frequency is not reduced in the absence of the direction change signal, and full tractive power is available from the motor to drive the vehicle up the ramp.

In a preferred embodiment, a foot pedal on the vehicle actuates a speed potentiometer which regulates duty cycle and also controls a first transistor switch that discharges a time delay capacitor when the foot pedal is relaxed and initiates charging of the capacitor when the foot pedal is again depressed, and the charging current to the capacitor constitutes the "direction change" signal. The generator mode signal is derived when current flowing through a diode in shunt to the armature exceeds a predetermined magnitude. An oscillator which regulates control pulse frequency is switchable to a reduced frequency condition in response to the presence of both the generator mode signal and the capacitor charging current "direction change" signal to thereby reduce field excitation and provide soft plugging of the motor. The time constant of the capacitor charging circuit is such that the duration of the "direction change" signal is greater than the contactor operate time plus the time required for the armature current to build up to the predetermined magnitude. A second transistor switch turned on when the energizing circuit is completed to the operating coil of either contactor disables the capacitor discharging means and thus prevents change in control pulse frequency when the vehicle is rolling backward down a ramp.

DESCRIPTION OF THE DRAWING

These and other objects and advantages of the invention will be more readily apparent from the following detailed description when considered in conjunction with the accompanying drawing wherein.

DETAILED DESCRIPTION

Figure 1:
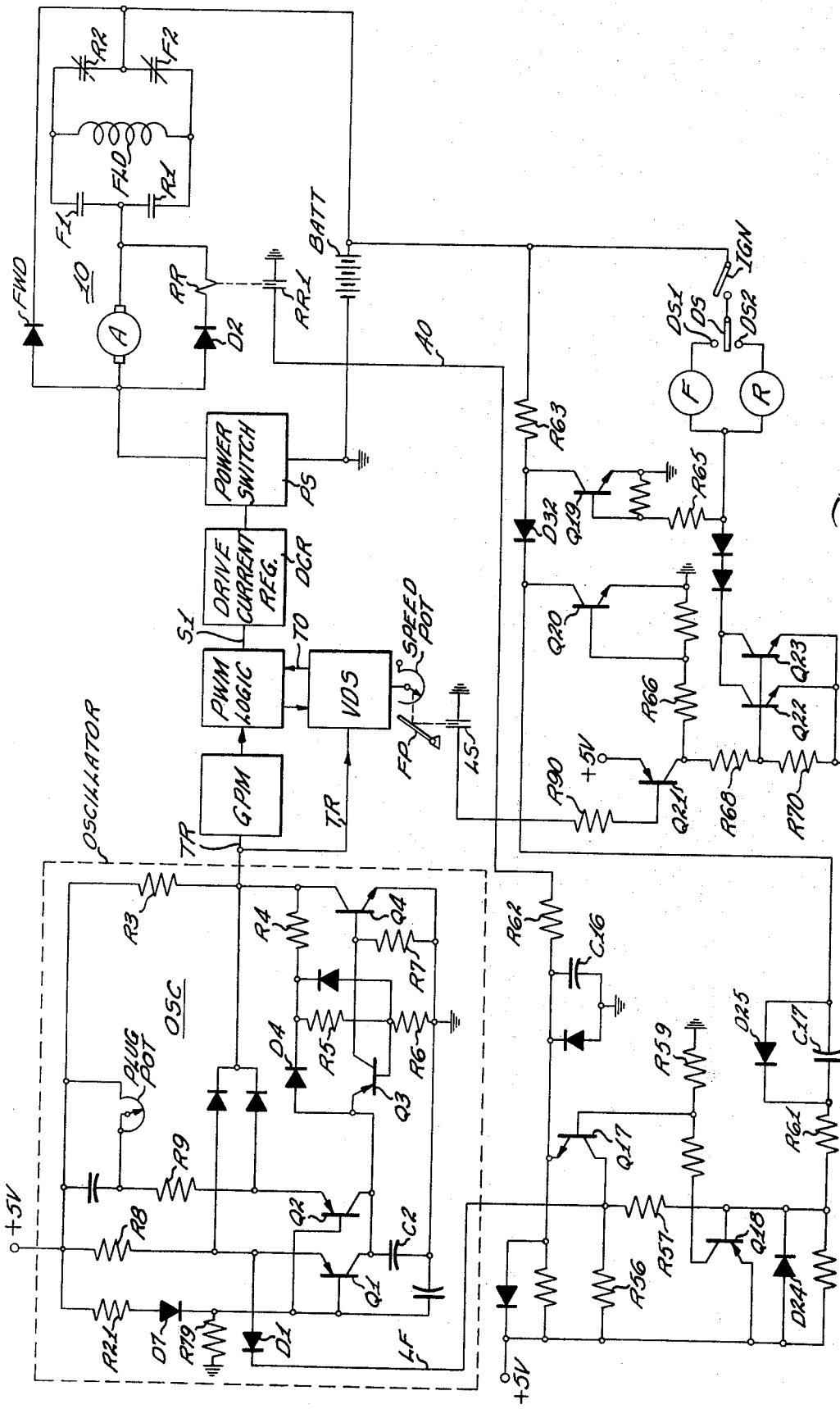
FIG. 1 is a circuit diagram of a preferred embodiment of the invention with known elements shown schematically by block representation.

The variable duty cycle control of the invention will be described in relation to a fork lift truck whose wheels (not shown) are driven by a series DC traction motor 10 having an armature A and a field winding FLD adapted to be connected in series with a power switch PS (shown in block form) across the terminals of a battery BATT on the vehicle through the normally open contacts F1 of a forward contactor and the normally closed contacts R2 of a reverse contactor to drive the truck in the forward direction, or through the normally open contacts R1 of the reverse contactor and normally closed contacts F2 of the forward contactor to propel the lift truck to the rear. Power switch PS may comprise a plurality of paralleled power transistors of the type whose current gain $h_{FE}$ falls off abruptly with increase of collector current so that current equalization means are not required and whose base drive is substantially constant and is supplied by a switching current regulator DCR shown in block form, both the power switch and the constant base drive source being disclosed in detail in the copending application of Raymond G. Price et al, Ser. No. 317,595 filed Dec. 22, 1972 entitled Variable Time Ratio Control Having Power Switch Which Does Not Require Current Equalizing Means and having the same assignee as this invention. The forward contactor may be operated when the lift truck operator actuates a direction lever switch member DS on the vehicle from a neutral position in one direction to engage stationary contact DS1 and thus energize its coil F, and the reverse contactor may be operated when the lift truck operator actuates direction lever switch member DS in the opposite direction from the neutral position to engage stationary contact DS2 and energize its coil R. A diode FWD in parallel with the inductive motor path provides a circuit for the inductive motor current when the power switch PS is open, and an armature diode, or plugging diode D2 in shunt to armature A provides a path for current flow when motor 10 is acting as a generator.

Motor 10 is energized by unidirectional pulses of current conducted by power switch PS, and the speed of motor 10 may be regulated by a pulse width modulation control which regulates the duty cycle of variable width pulses of voltage from battery BATT applied by power switch PS to motor 10 to proportionally vary the average voltage applied to the motor. The pulse width modulation (PWM) control may be similar to that disclosed in copending application Ser. No. 317,596 in the name of Frederick A. Stich, filed Dec. 22, 1972 entitled Control Having Conduction Limit Means to Vary Duty Cycle of Power Switch and having the same assignee as this invention wherein an oscillator OSC provides a train of triggering pulses which set the frequency of the PWM System. Each pulse from oscillator OSC triggers a guard pulse monostable multivibrator GPM shown in block form which generates a narrow guard pulse of fixed width that determines the minimum on-time of the PWM control and also sets the maximum time that power switch PS can operate in the unsaturated mode after it is turned on. Each triggering pulse from oscillator OSC on lead TR initiates a timing cycle in a variable delay circuit VDS shown only in block form, and each guard pulse from monostable multivibrator GPM sets a bistable latch (not shown) in a PWM LOGIC circuit shown only in block form. Setting of the bistable latch applies a signal on a lead S1 to the drive current regulator DCR to initiate a base drive current "control" pulse to power switch PS to generate the leading edge of each variable duty cycle voltage pulse to motor 10. After a selectively variable time interval controlled by a speed potentiometer SPEED POT, whose setting is regulated by a foot pedal, or accelerator FP on the truck, variable delay circuit VDS provides a timing signal on a lead to the PWM LOGIC circuit which resets the bistable latch thereon to terminate the control pulse to current switching regulator DCR and thus turn off power switch PS.

When the direction lever switch member DS is operated to reverse the polarity of field winding FLD, the truck may continue to travel in the forward direction for some time after the polarity of field winding FLD is reversed. Under such conditions motor 10 acts as a generator and armature current flows through armature diode D2. In prior art variable duty cycle controls, the armature current could be sufficiently high to result in rapid reverse of armature A with sufficiently severe, or "hard" plugging as to cause jerking, or jolts, which in some cases may spill the load carried by the truck or even upset and damage the truck. The variable duty cycle system embodying the invention provides controlled plugging of the traction motor 10 when reversing the direction of the truck by regulating the on-time of power switch PS when direction selection switch DS is reversed and motor 10 is acting as a generator.

The magnitude of armature current flowing through armature diode D2 is a function of the excitation of field winding FLD and the r.p.m. of armature A. Field excitation is a function of the magnitude of current flowing through power switch PS, and the control of the invention regulates field excitation by varying on-time of power switch PS, thereby controlling armature current and ulimately controlling severity of plugging.

When motor 10 is acting as a generator, a small change in current through field winding FLD will result in a large change of armature current. Higher armature current results in faster reversal of motor 10 and more severe plugging. Smooth plugging of motor 10 can facilely be accomplished when the magnitude of armature current is relatively low. In accordance with the invention, the percent on-time, or duty cycle, of power switch PS is reduced, when plugging is called for, to much lower values than the range of percent duty cycle utilized during normal operation. Such reduced percent duty cycle lowers the field excitation and thereby provides the reduction in armature current necessary for smooth plugging.

Reduction in percent duty cycle during plugging is preferably effected by reducing the frequency of the control pulses which turn power switch PS on and off. Under normal conditions oscillator OSC may provide triggering pulses at a frequency of 300 Hz which initiate each control pulse for power switch PS. When the operator plugs the vehicle by operating direction lever switch member DS, the triggering pulses are generated by oscillator OSC at a much lower frequency as described hereinafter.

When the truck is allowed to roll backward down a ramp and foot pedal FP is depressed, motor 10 will operate as a generator since armature A is being rotated in reverse by the truck wheels while the direction of current in the conductors on armature A and the polarity of field winding FLD are such as to cause armature A to rotate in the forward direction. Under such conditions it would be unsatisfactory to reduce the on-time, or duty cycle of power switch PS, since motor could not generate sufficient torque under such reduced on-time conditions to drive the truck up the ramp. The control of the invention discriminates between the condition when the motor 10 is operating as a generator and controlled plugging is desirable and the condition when motor 10 is acting as a generator and 100 percent duty cycle of power switch PS may be desirable.

OSCILLATOR — NORMAL OPERATION

Oscillator OSC preferably provides 300 Hz triggering pulses under normal conditions and may provide triggering pulses at an adjustable lower frequency during plugging of the motor 10. Oscillator OSC operates at the lower frequency when a logic 0 voltage (or plugging mode triggering signal) appears on lead LF, and this occurs when direction lever switch member DS is reversed and motor 10 is operating as a generator as described hereinafter. Under normal conditions charging current flows from a regulated supply source +5V through the emitter-collector circuits of two PNP transistors Q1 and Q2 in parallel into a timing capacitor C2. The bases of both transistors Q1 and Q2 are biased at a voltage level established by a voltage divider comprising the series arrangement of a resistance R21, a diode D7, and a resistance R79 connected between regulated power supply +5V and ground. The emitter of transistor Q1 is connected through a resistance R8 to the supply +5V and the current flowing in transistor Q1 is set by resistance R8 and the voltage divider R21, D7, R79.

The emitter of transistor Q2 is connected through the serial arrangement of a resistance R9 and a plugging potentiometer PLUG POT to the supply +5V, and the current flowing in transistor Q2 is determined by its base bias level and the resistance of potentiometer PLUG POT. Timing capacitor C2 is connected to the emitter of a timing transistor Q3 which is triggered on when the voltage across timing capacitor Q2 reaches a predetermined magnitude. A voltage divider comprising serial resistances R3, R4, R5 and R6 is connected between the +5V supply and ground. The base of timing transistor Q3 is connected to the junction of resistances R5 and R6 and its emitter is connected through a diode D4 to the junction of resistances R4 and R5 so the trip level of transistor Q3 is set by the ratio of R5 and R6. When the voltage on capacitor C2 reaches trip level of transistor Q3, it will turn on and its collector current will flow through a resistance R7 to ground to thereby forward bias the base of a transistor Q4 and turn it on. Turning transistor Q4 on clamps its collector to ground and provides a logic 0 triggering pulse on lead TR to the guard pulse monostable multivibrator GPM and also to the variable delay circuit VDS. Turning transistor Q4 on also drops the bias in the base of transistor Q3 to ground so that timing capacitor C2 discharges rapidly through transistor Q3 and the base-emitter circuit of transistor Q4 to ground. After timing capacitor C2 is discharged, transistors Q3 and Q4 turn off and allow transistors Q1 and Q2 to turn back on to again initiate charging of timing capacitor C2.

PLUGGING MODE

A reed relay current sensor RR is mounted on the truck in a location where it is within the magnetic field of the current flowing in the path through armature diode D2, and reed relay RR operates when a predetermined magnitude of armature current flows through diode D2 as a result of motor 10 operating as a generator. Operation of relay RR closes its contacts RR1 and provides ground, or logic 0 voltage "generator mode" signal on conductor 40. When direction lever switch member DS is operated to forward or reverse position, the base of an NPN "second" transistor switch Q19 is forward biased through the series arrangement of a resistance R65, forward contactor coil F or reverse contactor coil R, direction lever switch member DS and the ignition switch IGN to the + terminal of battery BATT so that Q19 conducts when a direction is selected. Transistor Q19 is turned off when the operator returns direction lever switch member DS to the neutral position in changing vehicle directions. The collector of second transistor switch Q19 is coupled through a resistance R63 to the +terminal of battery BATT and also through a diode D32 to one side of a time delay capacitor C17. Second transistor switch Q19 is conducting when direction switch member DS is actuated to forward or reverse positions and prevents capacitor C17 from discharging. Stated another way, second transistor switch Q19 disables the capacitor discharging means.

The contactor coils F or R are energized from a buffer amplifier stage of two paralleled power transistors Q22 and Q23 whose emitter-collector circuits are in series with coil F or R and battery BATT, depending upon the position of direction lever switch member DS. Base drive for buffer amplifier transistors Q22 and Q23 is provided by a PNP driver transistor Q21 whose emitter-collector circuit is connected in series with two resistances R68 and R70 between the voltage supply +5V and ground. The base of PNP driver transistor Q21 is shown connected to ground through a resistance R90 and the contacts of a limit switch LS operated by foot pedal FP so that driver transistor Q21 is forward biased and turns on when foot pedal FP is depressed and is reverse biased and turns off when foot pedal FP is relaxed.

The collector of driver transistor Q21 is connected through a resistance R66 to the base of an NPN "first" transistor switch Q20 whose collector is coupled to the junction of diode D32 and time delay capacitor C17. The emitter of first transistor switch Q20 is coupled to ground, and depression of foot pedal FP turns on driver transistor Q21 which conducts to couple the +5V supply to the base of first transistor switch Q20 and turn it on to clamp the right electrode of time delay capacitor C17 (as seen in FIG. 1) to ground.

Under normal operating conditions with direction lever switch member DS operated and foot pedal FP depressed, transistors Q19, Q20 and Q21 are conducting and time delay capacitor C17 has charged to +5 volts from the +5V supply with its right electrode clamped to ground by transistor Q20. When the direction lever switch member DS is returned by the operator to the neutral position, the base of second transistor switch Q19 is no longer forward biased (from battery BATT through lever DS) and it turns off. When the operator relaxes foot pedal FP, driver transistor Q21 turns off and thereby turns off first transistor switch Q20. The right electrode of capacitor C17 is no longer clamped to ground through transistor Q20, and C17 charges from the + terminal of battery BATT through resistance R63, diode D32, resistance R61, and diode D24 to the +5 volt supply so that the left electrode of capacitor C17 as seen in FIG. 1 is discharged to approximately −0.60 volts relative to its right electrode. Diode D25 in shunt to capacitor C17 limits the voltage across the capacitor.

When the truck operator actuates direction lever switch member DS through the neutral position to engage the other stationary contact, the base of second transistor switch Q19 is again forward biased and it turns on. When the truck operator again depresses foot pedal FP, driver transistor Q21 is forward biased and turns on, and the voltage drop resulting from the flow of collector current through resistances R68 and R70 forward biases the base of first transistor switch Q20 and turns it on which again clamps the right electrode of time delay capacitor C17 to ground. Charging current then begins to flow into capacitor C17 from the +5V supply through resistance R61 and diode D24, and such charging current into capacitor C17 is termed a "direction change" signal. The flow of charging current through resistance R61 develops a voltage which forward biases the base of a PNP transistor Q18 relative to its emitter and turns it on, and the flow of current in the emitter-collector circuit of transistor Q18 through a collector resistor R59 forward biases the base of a transistor Q17 and turns it on.

The time constant for charging capacitor C17 through resistance R61 is approximately 0.40 seconds so that transistor Q18 is held on for sufficient time to permit the selected (reverse or forward) contactor to operate and for armature current to begin flowing through plugging diode D2. As soon as the current through plugging diode D2 builds up to a predetermined magnitude, reed relay RR is operated and closes its contacts RR1 to ground lead 40. The "generator mode" ground signal on lead 40 is applied to the emitter of transistor Q17 and latches it on. The resulting flow of current through a collector resistor R57 for transistor Q17 latches transistor Q18 on.

When transistor Q17 turns on, it clamps lead LF to the ground (logic 0 voltage) generator mode signal on conductor 40. The ground (logic 0 voltage) signal on lead LF can be termed a "plugging mode" signal and is coupled through a diode D1 in oscillator OSC to the emitter of transistor Q1 to turn off transistor Q1 and thereby cause oscillator OSC to provide triggering pulses at the lower frequency. Charging current for timing capacitor C2 now flows only through transistor Q2, and consequently the voltage across timing capacitor C2 builds up at a much lower rate to thereby reduce the frequency of the triggering pulses from oscillator OSC.

The emitter of charging current transistor Q2 is coupled to the +5V supply through resistor R9 and the plugging potentiometer PLUG POT in series. By adjusting the plugging potentiometer, the truck operator can vary the plugging mode triggering pulse frequency between approximately 8 Hz and 30 Hz, thereby permitting adjustment for both hard and soft plugging. The truck operator still maintains control over plugging by regulating the position of foot pedal FP to thereby control the percent duty cycle of the pulses which turn power switch PS on and off, but the plugging potentiometer PLUG POT sets the most severe plugging to which the truck can be subjected when the foot pedal FP is fully depressed. The control stays in the plugging mode until the truck slows sufficiently so that armature current decays below the triggering level for reed relay RR, at which time reed relay RR opens its contacts RR1 to remove ground from lead 40. Transistors Q17 and Q18 then turn off and logic 1 from supply source +5V is again applied through resistance R56 to lead LF so that transistor Q1 of oscillator OSC turns on and the oscillator resumes its 300 Hz triggering pulse output.

Resistor R62 and a shunt capacitor C16 to ground connected between the reed relay contacts RR1 and lead LF form a filter with a slow charge and rapid discharge time constant which eliminates any ripple that might be caused by rapid opening and closing of the reed relay RR during initiation of plugging.

During normal starting, the soft plugging circuit does not cause oscillator OSC to operate at the lower frequency because no armature current flows through diode D2 and consequently reed relay RR does not operate.

Although the motor 10 operates as a generator and reed relay RR operates when the truck rolls backward down a ramp, the soft plugging circuit will not actuate oscillator OSC to operate at the lower frequency because the truck operator does not operate direction lever switch member DS between forward and reverse positions. Inasmuch as the direction change signal is not generated, the second transistor switch Q19 remains conducting and prevents time delay capacitor C17 from discharging, i.e., Q19 disables the capacitor discharging means.

Figure 2:
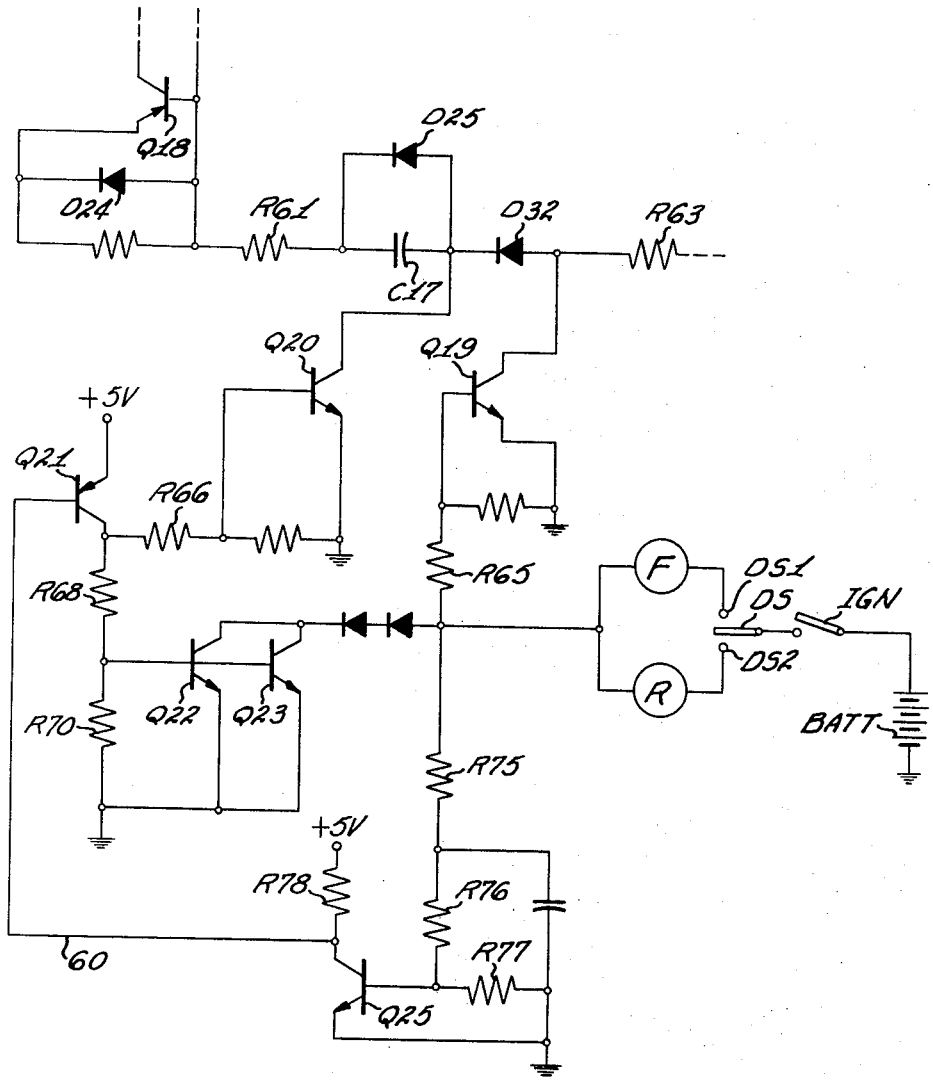
FIG. 2 is a partial circuit diagram of an alternative embodiment of the invention.

In the embodiment of FIG. 1, first transistor switch Q20 is controlled by foot pedal FP so that charging of capacitor C17 (generation of the direction change signal) does not occur until direction selection switch member DS is reversed, foot pedal FP is relaxed, and foot pedal FP is again depressed. FIG. 2 illustrates an alternative embodiment wherein the direction change signal (charging current into capacitor C17) is generated upon movement of the direction selection switch member DS from the forward or reverse position to the opposite position to thereby open the energizing circuit to the operating coil F or R of one contactor and the closing of the energizing circuit to the operating coil of the other contactor. The limit switch of the FIG. 1 embodiment controlled by the foot pedal is eliminated in the embodiment of FIG. 2 and is replaced by a "neutral switch" comprising an NPN transistor Q25 having its collector connected through a resistor R78 to the +5V source, its emitter grounded, and its base connected to a voltage divider comprising three resistances R75, R76, R77 connected in series between ground and the junction of the contactor operating coils F and R. The collector of neutral switch transistor Q25 is connected by conductor 60 to the base of driver transistor Q21.

As long as direction selection switch member DS is in the forward or reverse position, neutral switch transistor Q25 is forward biased and conducts to clamp the base of PNP driver transistor Q21 to ground and thereby turn on first transistor switch Q20 which grounds the right hand electrode of capacitor C17. Actuation of direction selection switch member DS to the neutral position releases both second transistor switch Q19 and neutral switch transistor Q25 which ceases to conduct and thus turns off driver transistor Q21. Turning off of driver transistor Q21 releases first transistor switch Q20 to disconnect ground from capacitor C17 and permit it to discharge. Actuation of direction selection switch member DS to the opposite position again turns on neutral switch transistor Q25, driver transistor Q21, and first transistor switch Q20 which again grounds the right electrode of capacitor C17 so that charging current begins to flow into capacitor C17 to thereby derive the direction change signal.

It will thus be appreciated that both first and second transistor switches Q19 and Q20 are controlled by direction selection switch member DS in this embodiment of the invention.

While only a few embodiments of the invention have been illustrated and described, it should be understood that we do not intend to be limited to such embodiments, for many modifications and variations thereof will be obvious to those skilled in the art.

The embodiments of an invention in which an exclusive property or privilege is claimed are defined as follows:

1. In a vehicle driven by a reversible electric motor having an armature and a field winding connectable in series with an electrical power source and a power switch by a forward contactor or by a reverse contactor,
 means for providing a succession of control pulses, said power switch being controlled by said control pulses to apply voltage pulses from said power source to said motor,
 means to selectively vary the duty cycle of said control pulses,
 a diode in shunt to said armature, armature current sensing means operable when the current flowing through said armature diode exceeds a predetermined magnitude, direction change means for opening one of said contactors and closing the other, and means responsive to operation of both, but non-responsive to operation of only one, of said direction change means and said armature current sensing means for actuating said control pulses providing means to reduce the frequency of said control pulses and thereby plug said motor smoothly when the direction of said vehicle is reversed.

2. In the combination of claim 1 wherein said means for providing a succession of control pulses includes oscillator means for deriving a train of triggering pulses, said means to selectively vary duty cycle includes means responsive to each said triggering pulse to initiate one of said control pulses, variable delay means responsive to each triggering pulse to initiate a time delay interval and being adapted to terminate said control pulse at the expiration of said time delay interval, and means including a speed potentiometer on said vehicle for selectively varying said time delay interval.

3. In the combination of claim 2 wherein said oscillator means is switchable in response to a plugging mode input signal to a low frequency condition wherein it generates triggering pulses of reduced frequency, and said means to reduce the frequency of said control pulses includes means for generating said plugging mode signal in response to operation of both said direction change means and said armature current sensing means.

4. In the combination of claim 3 wherein said means for selectively varying said time delay interval includes a foot pedal on said vehicle for actuating said speed potentiometer and having relaxed and operated conditions, and said means to generate said plugging mode signal is only operable after operation of said direction change means and operation of said armature current sensing means and relaxation of said foot pedal and the subsequent depression of said foot pedal to said operated condition.

5. In the combination of claim 4 wherein said armature current sensing means derives a generator mode signal when the armature current exceeds said predetermined magnitude, said means to reduce the frequency of said control pulses includes a capacitor, means to discharge said capacitor upon the opening of said one contactor, means to initiate charging of said capacitor upon the closing of the other contactor, the charging current to said capacitor constituting a direction change signal, and means responsive to the presence of both said direction change signal and said generator mode signal for deriving said plugging mode signal.

6. In the combination of claim 5 wherein said capacitor is in an RC time delay circuit whose time constant is greater than the operating time of one of said contactors plus the time required for said armature current to build up to said predetermined magnitude, and said means for deriving said plugging mode signal includes transistor switch means operated by the charging current flowing into said capacitor for applying said plugging mode signal to said oscillator means, said transistor switch means being latched in operating condition by said generator mode signal.

7. In the combination of claim 6 wherein said means to discharge said capacitor includes first transistor switch means for connecting one electrode of said capacitor to and disconnecting it from ground and being operable in response to the closing of an energizing circuit to the operating coil of either of said contactors.

8. In the combination of claim 7 wherein said first transistor switch means is controlled by said foot pedal, and including second transistor switch means for disabling said means to discharge said capacitor when an energizing circuit is closed to the operating coil of either of said contactors.

9. In the combination of claim 5 and including plugging potentiometer means for selectively varying the frequency of the triggering pulses from said oscillator means when in said low frequency condition to thereby set the maximum severity of plugging.

10. In the combination of claim 5 wherein said direction change means includes a manually operable direction selection lever on said vehicle having forward and reverse positions wherein circuits are completed to the operating coils of said forward and reverse contactors respectively and a neutral position wherein neither operating coil is energized, said means to discharge said capacitor is operable upon actuation of said direction selection lever to said neutral position, and said means to initiate charging of said capacitor is operable upon the subsequent actuation of said direction selection lever to either forward or reverse position.

11. In the combination of claim 10 wherein said means to discharge said capacitor includes first transistor switch means controlled by said foot pedal for connecting one electrode of said capacitor to and disconnecting it from ground, said means to initiate charging of said capacitor also includes said first transistor switch means, and also including second transistor switch means for disabling said capacitor discharging means when said direction selection lever is in said forward or in said reverse position.

12. In a vehicle driven by a reversible electric motor having an armature and a field winding connectable by a forward contactor or by a reverse contactor in series with an electrical power source and a power switch, the combination of:

means for providing a succession of control pulses, said power switch being controlled by said control pulses to apply voltage pulses from said power source to said motor, means to selectively vary the duty cycle of said control pulses, a diode in shunt to said armature, means for generating a direction change signal in response to the opening of the energizing circuit to one of said contactors and closing of the energizing circuit to the other, means for generating a generator mode signal when the current flowing through said diode exceeds a predetermined magnitude, and plugging mode means responsive to the presence of both, but non-responsive to presence of only one, of said direction change and said generator mode signals for reducing the frequency of said control pulses to thereby provide smooth plugging of said motor when the direction of said vehicle is reversed.

13. In the combination of claim 12 wherein said means for generating said direction change signal derives a signal whose duration is greater than the operating time of one of said contactors plus the time interval required for the current flowing through said diode to build up to said predetermined magnitude.

14. In the combination of claim 12 wherein said means for generating said direction change signal includes:
a capacitor, and
means including a transistor switch operable in response to the opening of said energizing circuit to said one of said contactors for discharging said capacitor and being responsive to the subsequent closing of the energizing circuit to the other contactor for initiating charging of said capacitor, the charging current to said capacitor constituting said direction change signal.

15. In the combination of claim 14 wherein said means for providing a succession of control pulses includes oscillator means normally providing a fixed frequency output and being switchable to a reduced output frequency condition in response to a plugging mode signal input,
transistor switch means operable to apply said plugging mode signal to said oscillator means when said generator mode signal is present, and
means responsive to said charging current to said capacitor for deriving a voltage to bias said transistor switch means to its operated condition, said transistor switch means being latched in said operated position by said generator mode signal.

16. In the combination of claim 14 wherein said means to selectively vary the duty cycle of said control pulses includes a speed potentiometer regulated by a speed control member on said vehicle having relaxed and operated positions, and said means for generating said direction change signal includes:
a capacitor,
means including a first transistor switch operable in response to movement of said speed control member to said relaxed position to discharge said capacitor and being responsive to the subsequent movement of said speed control member to said operated position to initiate charging of said capacitor, the charging current to said capacitor constituting said direction change signal, and
means including a second transistor switch for disabling said capacitor discharging means when the energizing circuit is closed to either said forward contactor or to said reverse contactor.

17. In the combination of claim 16 wherein said means for providing a succession of control pulses includes oscillator means for providing a train of triggering pulses and being switchable in response to a plugging mode input signal to a low frequency condition wherein the frequency of said triggering pulses is reduced, said means to selectively vary duty cycle includes means responsive to each triggering pulse to initiate one of said control pulses, variable delay means responsive to each triggering pulse to initiate a time delay interval and being adapted to terminate said control pulse at the expiration of said time delay interval, and means including said speed potentiometer for selectively varying said time delay interval, and wherein said means for reducing the frequency of said control pulses includes transistor switch means operable in response to both the flow of charging current into said capacitor and the presence of said generator mode signal for applying said plugging mode signal to said oscillator means.

18. In the combination of claim 16 wherein said plugging mode signal is a logic 0 voltage and said generator mode signal is also a logic 0 voltage and said transistor switch means when turned on couples said logic 0 generator mode signal to said oscillator means as said plugging mode signal, and wherein said means for reducing the frequency of said control pulses also includes means responsive to said charging current to said capacitor for deriving a voltage to bias said transistor switch means into conduction, said transistor switch means being latched on by said generator mode signal.

19. In the combination of claim 12 and including a manual direction selection lever on said vehicle having forward and reverse positions in which said forward contactor and said reverse contactor are operated respectively and a neutral position wherein neither contactor is operated, and said means for generating said direction change signal is operated upon movement of said direction lever from said forward or said reverse position through said neutral position to the opposite position.

20. In the combination of claim 19 wherein said means to selectively vary the duty cycle of said control pulses includes a speed potentiometer regulated by a speed controlling member on said vehicle having relaxed and operated positions, and said means for generating said direction change signal includes a capacitor, means including a first transistor switch controlled by said speed controlling member for discharging said capacitor when said speed controlling member is in said relaxed position and for subsequently initiating charging of said it is in said operated position, and means including a second transistor switch controlled by said direction selection lever for disabling said capacitor discharging means when said direction selection lever is in said forward position or said reverse position, the charging current to said capacitor constituting said direction change signal.

21. In the combination of claim 12 wherein said means for generating said generator mode signal includes a current sensor reed relay disposed within the magnetic field generated by the current flowing in the path through said diode.

22. In the combination of claim 14 wherein said means to selectively vary the duty cycle of said control pulses includes a speed potentiometer operated by a foot pedal on said vehicle having relaxed and operated positions,
said means for discharging said capacitor is only operable in response to both opening of said energizing circuit to said one contactor and to the movement of said foot pedal to said relaxed position, and said means for initiating charging of said capacitor is only operable in response to both the closing of said energizing circuit to the other contactor and depressing said foot pedal to said operated position.

23. In the combination of claim 16 wherein said speed control member is a foot pedal, said means for generating a direction change signal includes a direction selection lever on said vehicle having forward and reverse positions in which said forward and reverse contactors respectively are closed and a neutral position between said forward and reverse positions wherein both of said contactors are released, and wherein said means for disabling said capacitor discharging means is operable when said direction selection lever is in said forward position or said reverse position.

24. In the combination of claim 16 wherein the time constant of said capacitor charging circuit is greater than the operating time of one of said contactors plus the time required for the current through said diode to build up to said predetermined magnitude, and said first transistor switch disconnects one electrode of said capacitor from ground to discharge said capacitor and reconnects to the ground to initiate charging thereof.

25. In the combination of claim 15 and including plugging potentiometer means to selectively vary the output frequency of said oscillator means when in said reduced frequency condition to thereby permit setting of the maximum severity of plugging.

* * * * *

PO-1050
(5/69)

UNITED STATES PATENT OFFICE
CERTIFICATE OF CORRECTION

Patent No. 3,828,235         Dated August 6, 1974

Inventor(s) Raymond G. Price and Frederick A. Stich

It is certified that error appears in the above-identified patent and that said Letters Patent are hereby corrected as shown below:

Column 12, line 39, after "said" (first occurrence), insert --- capacitor when --- .

Signed and sealed this 10th day of December 1974.

(SEAL)
Attest:

McCOY M. GIBSON JR.
Attesting Officer

C. MARSHALL DANN
Commissioner of Patents